(No Model.)

L. D. B. SHAW.
HORSE HAY RAKE.

No. 280,963. Patented July 10, 1883.

Witnesses.
E. Planta.
T. F. Currier

Inventor.
L. D. B. Shaw
by J. H. Adams
Atty.

N. PETERS. Photo-Lithographer, Washington, D. C.

UNITED STATES PATENT OFFICE.

LORENZO D. B. SHAW, OF REVERE, MASSACHUSETTS.

HORSE HAY-RAKE.

SPECIFICATION forming part of Letters Patent No. 280,963, dated July 10, 1883.

Application filed January 19, 1883. (No model.)

*To all whom it may concern:*

Be it known that I, LORENZO D. B. SHAW, a citizen of the United States, residing at Revere, in the county of Suffolk and State of Massachusetts, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in the construction of horse hay-rakes; and it consists in a combination and arrangement of parts as hereinafter fully set forth.

Figure 1:
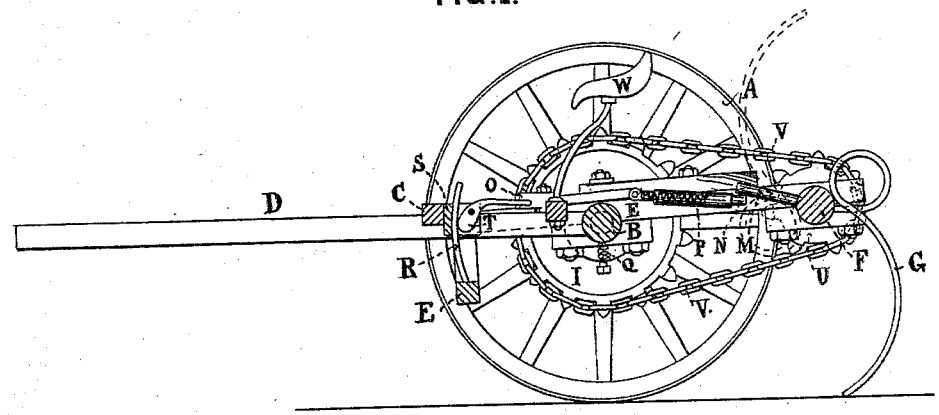
Figure 2:
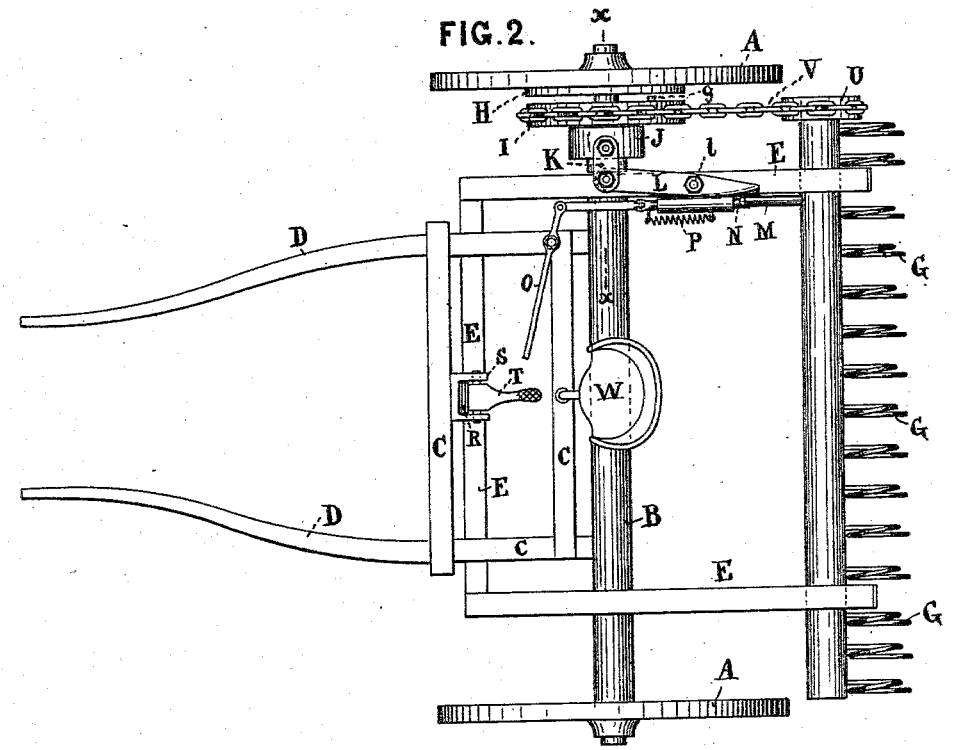
Figure 4:
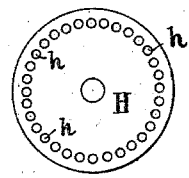
Figure 3:
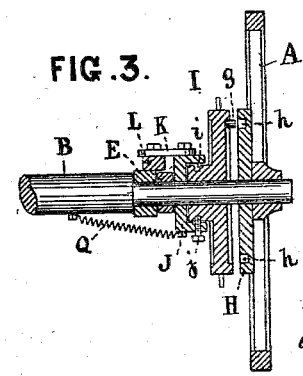

Referring to the accompanying drawings, Figure 1 is a vertical longitudinal section of a horse hay-rake embodying my invention. Fig. 2 is a top or plan view of the same. Fig. 3 is a section on line $x\ x$ of Fig. 2. Fig. 4 is a view of the perforated disk attached to the wheel.

C C is a frame carrying the shafts, and firmly attached to the axle B of wheels A A. To the axle B is also connected, but so as to turn freely on the same, a frame, E, the forward end of which is depressed, so as to pass under the frame C.

Connected to the rear end of the frame E is a revolving shaft, F, constituting the rake-head, and carrying the spring-teeth G.

H is a metal disk or plate secured to the inner side of one of the wheels A, and is provided with a circular row of holes near its periphery. (See Fig. 4.)

I is a sprocket-wheel working loosely on the axle B, and having a projecting hub, in which is a groove, $i$, (see Fig. 3,) for the reception of a screw or pin, $j$, which passes the collar J, by means of which the collar J and wheel I are held together, while at the same time the latter is free to rotate. On the sprocket-wheel I is a pin or stud, $g$, which engages with any one of the holes in disk H. The collar J is provided with a spring, Q, for the purpose of forcing said collar outward, and with it the sprocket-wheel I, into contact with the disk H. The said collar is connected by a plate or piece, K, to the lever L, having its fulcrum at $l$ on the frame E. The outer or free end of the lever L is beveled off, as shown, for a purpose hereinafter explained.

M is an arm projecting from the rake-head F, and is held, so as to prevent the rake-head from rotating, by means of a bolt, N, which latter is also held in position by a spring, P. The outer end of bolt N is attached to a rod or bar connected with a lever, O, under control of the driver. When the lever O is pulled upon by the driver, the bolt N is drawn back to allow the arm M to pass and the rake-head to rotate. When the lever O is released by the driver, the bolt N is retracted by the spring P, and again arrests the motion of the arm M and the rake-head. On one end of the rake-head F is a sprocket-wheel, U, on which and the sprocket-wheel I is an endless chain, V.

To the forward part of the frame E is fixed a bar, R, extending upward and passing through a box, S, attached to the frame C. At the rear of the box S is a cam-lever, T, which, when its outer end is depressed, will bear against and hold the bar B, and thus prevent the frame C from dropping when the rake-teeth are raised from the ground. W is the driver's seat, carried on the frame C.

The operation is as follows: As the machine is drawn along, the teeth G will bear upon the ground and adapt themselves to any unevenness of the surface by reason of the frame E swinging on the axle B, and when sufficient hay has been gathered to form a windrow the driver pulls upon the lever O, which withdraws the bolt N and allows the arm M to pass, thus releasing the end of lever L. The spring Q then forces the collar J outward, and with it the sprocket-wheel I, up to the disk H, the pin $g$ taking into one of the holes $h$. The sprocket-wheel will then revolve with the wheel A, and through the chain V rotate the rake-head F one revolution, when the arm M will strike upon the beveled portion of the lever L, and thus cause the sprocket-wheel to be withdrawn from connection with the disk H, when the wheel A will be free to revolve alone, the arm M on rake-head F being held by the bolt N until the lever O is again moved by the driver. Just before moving the lever O the driver presses upon the cam-lever T, which causes the cam to bear against and jam the bar R, and thus hold the frame E and prevent the rear end from dropping down when the rake-teeth are raised from the ground.

What I claim as my invention is—

1. In a horse hay-rake, the combination of the sprocket-wheels I and U, the rake-head F, the collar J, disk H, provided with holes $h$, the pin $g$, lever L, arm M, bolt N, spring P, and lever O, as and for the purpose specified.

2. In combination, the rotating rake-head F, provided with the spring-teeth G, the frame E, passing forward under the frame C, the box S, bar R, and cam-lever T, all as set forth and shown.

In testimony whereof I affix my signature in presence of two witnesses.

LORENZO D. B. SHAW.

Witnesses:
 JOS. H. ADAMS,
 E. PLANTA.